United States Patent [19]

Quisquater et al.

[11] Patent Number: 5,214,701
[45] Date of Patent: May 25, 1993

[54] METHOD OF PROCESSING DATA BY COMPRESSION AND PERMUTATION FOR MICROCIRCUIT CARDS

[75] Inventors: Jean-Jacques Quisquater, Rhode Saint Genese, Belgium; Xavier Delaporte, Trappes; Benoit Leterrier, Verrieres Le Buisson, both of France

[73] Assignee: U.S. Philips Corporation, New York, N.Y.

[21] Appl. No.: 558,122

[22] Filed: Jul. 24, 1990

[30] Foreign Application Priority Data

Jul. 25, 1989 [FR] France ................................ 89 10004

[51] Int. Cl.$^5$ .............................................. H04L 9/06
[52] U.S. Cl. ................................... 380/29; 380/50
[58] Field of Search ................................. 380/29, 50

[56] References Cited

U.S. PATENT DOCUMENTS

| | | | |
|---|---|---|---|
| 4,274,085 | 6/1981 | Marino, Jr. | 380/29 |
| 4,908,861 | 3/1990 | Brachtl et al. | 380/29 |
| 5,001,753 | 3/1991 | Davio et al. | 380/29 |
| 5,003,597 | 3/1991 | Merkle | 380/29 |
| 5,008,935 | 4/1991 | Roberts | 380/29 |
| 5,068,894 | 11/1991 | Hoppe | 380/29 |
| 5,150,401 | 9/1992 | Ashby, III et al. | 380/29 |

*Primary Examiner*—Salvatore Cangialosi
*Attorney, Agent, or Firm*—Jack D. Slobod; Richard A. Weiss

[57] ABSTRACT

This method of processing data protected by a coding is particularly suitable to be used in microcircuit cards utilizing the method of processing data of the DES type. In the DES method, a step SP of transformation of compression S is included, which is followed by an irregular permutation P. According to the method, the transformation of compression S is effected in such a manner that the data to be stored are subjected beforehand to a permutation P, while a masking system is calculated specifically to permit the execution of the said step SP by recuperating only the desired bits, the latter then being automatically present at the predetermined storage locations.

6 Claims, 1 Drawing Sheet

METHOD OF PROCESSING DATA BY COMPRESSION AND PERMUTATION FOR MICROCIRCUIT CARDS

A) FIELD OF THE INVENTION

The present invention relates to a method of processing data protected by a coding for microcircuit cards, the coding being obtained by a succession of transformations of the input data utilizing a secret code, the transformations comprising in a general manner permutations of bits, shifts or rotations, binary modulo 2 sums, compressions of words, expansions of words and, more particularly, a transformation step SP, during which a transformation of compression S by look-up tables designated by Ti and an irregular permutation are effected.

B) BACKGROUND OF THE INVENTION

Such a method of processing data protected by a coding is described in the publication "Federal Information Processing Standards Publication" (FIPS PUB 46) of Jan. 15th 1977, of the National Office of Standards of the U.S. Ministry of Commerce. When such a processing is applied to the data utilized in a microcircuit card, the processing must be as rapid and as compact as possible, the code length admissible in a microcircuit card being strongly limited. One of the steps of the coding, which step will be designated from now on as "Step SP", consists in a compression transformation S by look-up tables designated by Ti (corresponding to respective selection functions Si) followed by an irregular permutation P.

Conventionally, the compression S and the permutation P are effected in sequence (the permutation P being applied to the result of the compression S), which on the one hand necessitates a prohibitive processing time and, on the other hand requires a great code length and hence, an exaggerated storage occupation. In fact, the conventional method of carrying out a permutation of words, irrespective of their type, consists in taking each bit of the input word, calculating its position in the output word (generally by means of a table when the permutation is entirely irregular, as in the present case) and positioning therein the value of the bit considered. Since this processing is effected bitwise, it is clear that the cost of this method is proportional to the number of bits to be permuted. As to the execution of the transformation of compression S, the input word is decomposed into elementary words Wi, used as an index in the tables Ti, so as to obtain) the output word the tables Ti supplying (after concatenation of the different values stored in the tables Ti) the output word based on the elementary words Wi.

BRIEF DESCRIPTION OF THE DRAWINGS

Immediately after that heading and on the next line insert as a paragraph.

C) SUMMARY OF THE INVENTION

Figure 1:
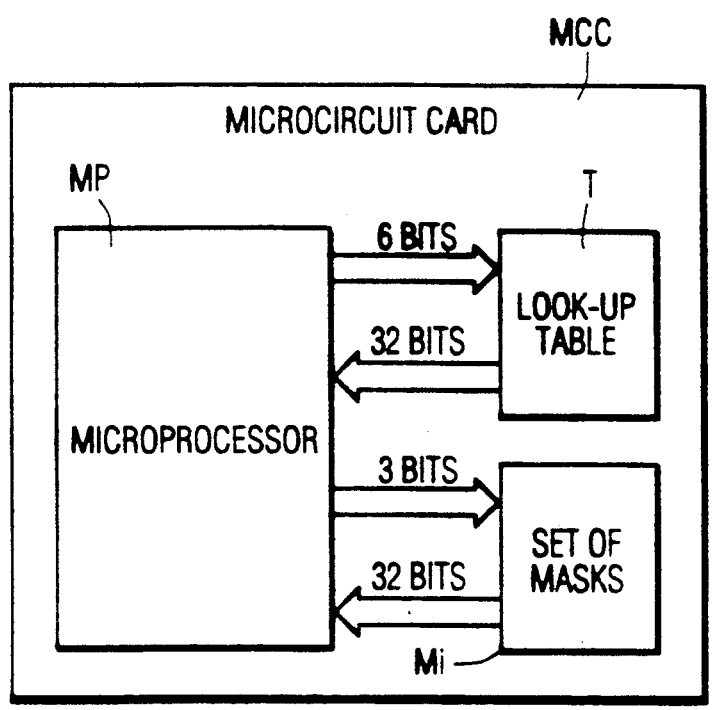
FIG. 1 is a diagram showing a microcircuit card of the present invention.

The present invention proposes a method of the kind mentioned above, which, however, does not suffer from the limitations of the known method and provides a more favorable ratio between processing speed and storage occupation.

For this purpose, the method of processing data protected by a coding of the kind mentioned in the opening paragraph is characterized in that in the step SP the compression transformation S and the permutation P are regrouped, so that the compression transformation S is obtained in such a manner that the step of carrying out the irregular permutation P is included in the execution of the compression transformation S, i.e., the look-up tables Ti being reorganized in a single look-up table T which is already permutated by permutation p in order to permit, in conjunction with a masking and summation method, the carrying out of the step SP while recuperating only the desired bits, the latter being presented automatically at the predetermined locations.

Thus, the aforementioned reorganization of the look-up tables of the compression transformation S in combination with an associated masking system permits the step of bitwise processing (in the present case the permutation P) to be avoided and, hence, results in a very substantial diminution in both the processing time and the code length necessary to carry out the step SP.

DETAILED DESCRIPTION OF THE PREFERRED EMBODIMENT

This method is particularly suitable to carry out the step SP of the compression transformation S and of the permutation P effected for a microcircuit card utilizing the method of processing data protected by a DES coding (Data Encryption Standard).

In this type of card, utilizing an 8 bit micro-processor, for example, a Motorola type 6805 or of the Intel type 8048, it is necessary, in order to process words having a length exceeding 8 bits, to carry out the same operation several times.

Moreover and in a general manner, in this kind of processing, for words of 64 bits only 48 bits, are significant, which 48 bits must be reduced to 32 bits during the operation of compression S. This operation of compression transformation S is for practical reasons divided into several sub-operations, for example 8, of compression (S1 to S8), each permitting a reduction from 6 input bits ($6 \times 8 = 48$ bits) to 4 output bits ($4 \times 8 = 32$ bits).

In this context, a part of the invention has consisted in showing that it was possible to reorganize the tables Ti ($T_1$ to $T_8$) associated with each of the 8 elementary compressions (S1 to S8) in a single table T which, associated with a masking and summation method, will permit, after recalculation of the elements of the table T and of the associated masks, of obtaining at the output of the new compression transformation (designated hereinafter by S'), a result identical to that which could have been obtained if, as according to the prior art, the permutation P had been effected after the compression transformation S.

For a better apprehension of the invention, a simple mathematical demonstration can be used to show the identity of the results obtained with regard to their correctness before or after the application of the inventive idea, while bearing in mind that after the application of the invention the processing time and the code length required are considerably reduced.

According to the prior art, the step of transformation SP is effected in two time periods: a first time period, in which the transformation of compression S is effected, followed by a second time period for carrying out the permutation P.

As has been apparent from the foregoing, the compression S is decomposed into eight elementary compressions (S1 to S8). Each elementary compression Si transforms a number encoded in 6 bits into another number encoded in 4 bits, the input value (6 bits) being permuted so as to supply a scrutinization index of the look-up table Ti, which table is intended to supply the output value (4 bits). Each table Ti is therefore constituted by $2^6$ values encoded in 4 bits, that is for the assembly of the 8 elementary compressions S1 to S8 $64 \times 4 \times 8$ bits = 256 octets. The output of the compression S is then obtained by concatenation of the 8 output values of the compressions Si, the result being supplied over 32 bits. The assembly is then permuted during the operation of permutation P to supply the final result.

The idea of the invention consists in considering not 8 independent tables Ti, but a single look-up table T constituted by $2^6$ words of 32 bits, the values being grouped in 4 octets per storage line resulting from the concatenation of the 8 outputs of the operations S1 to S8 (i.e. the 8 values encoded in 4 bits of the old tables Ti for the storage line considered) and permutation of those outputs by permutation P. In fact in accordance with the number of the operation Si, the significant quartet is not the same.

Each value of 6 input bits corresponds to an index in the look-up table T, which index therefore points to a word of 32 bits (if the input is equal to i, the $i^{th}$ storage will be addressed), this being valid irrespective of the number of the operation Si concerned. In order to retain only the significant bits for each operation Si, it is then sufficient to mask the intermediate results with the adequate mask (which permits of forcing the nonsignificant bits for the operation Si to zero). A set of masks Mi, eight are therefore necessary, i.e. one for each operation Si. The final result of the compression transformation S will then be obtained by summing up the 8 masked results (because zero is a neutral element for the addition).

In the case of the sole compression transformation S, the masks to be formed can evidently be calculated because they each correspond to the significant quartet of the output register for each operation Si.

Let it be assumed that Ii is the input i and Oi is the corresponding output of the elementary transformation of compression Si, then Mi is the $I^{th}$ mask corresponding to the elementary compression Si and thus the relation:

$$Oi = Mi(Si)(Ii).$$

The final result of the compression transformation S is then defined by:

$$S = \Sigma Oi = \Sigma Mi(Si(Ii))].$$

After execution of the permutation P, the result of the transformation SP will then be:

$$SP = P(\Sigma Mi(Si(Ii))).$$

Now, according to the invention, the same mathematical approach will be chosen in the case in which the permutation P is integrated in the execution of the transformation of compression S, the basic operation being identical, but each storage of the table T being permuted by P beforehand. The masks being also permuted by P for the recuperation at the output of the 32 bits at the right locations. In fact, the 4 significant bits to be recuperated during an operation S'i are no longer consecutive in fours, as in the execution of the transformation of compression S, but have already been permuted by P.

Thus, if Mi is the $i^{th}$ mask, the new mask will therefore be M'i and thus the relation:

$$M'i = P(Mi).$$

The relation SP therefore becomes:

$$SP = S \, o \, P$$
$$= (\Sigma \, Si \, o \, Mi) \, o \, P.$$

Since P is a one-to-one correlation, because to each input bit corresponds a single output bit and inversely, it is therefore clear that:

$$SP = \Sigma(Si \, o \, P) \, o \, (Mi \, o \, P)$$
$$= \Sigma S' \, i \, o \, M'i$$
$$= S'.$$

Thus, S' = SP and the two methods are accurately equivalent. A very important advantage is obtained by the method of the invention. It permits the separate execution of the permutation P to disappear, resulting in a more rapid execution and a code gain with respect to the method according to the prior art. The prior art method involving execution of the permutation P separately following the execution of the compression transformation S.

According to a variation, the method of executing the compression transformation S' according to the invention is characterized in that it can be carried out in a manner similar to that in which any permutation of an arbitrary number of bits is carried out. It in fact suffices to apply the invention to the execution of the function of identity Id (which is a compression of the type S of a particular kind) and to note that S' = P(S) = P(Id) = P. According to the invention, it is thus possible to execute the permutations by look-up tables and masking. This type of execution is particularly suitable for the realization of permutations on 16- and 32-bit microprocessors (in which the operations of loading the intermediate results, masking and summing up can be effected in a strongly reduced number of instructions, even in a single instruction).

The following non-limitative example provides clear understanding of how the invention can be realized.

Let it be assumed that $I_1$ is an input of the compression transformation $S_1$ with $I_1 = 00011101$; after an operation of permutation of the bits of $I_1$ according to the DES algorithm, an index IN equal to 3C (hexadecimal), i.e. 60 in decimal, will be obtained; the output of the compression transformation $S_1$ will then be $O_1$ (60) = 0101.

Once the 8 inputs $I_1$ to $I_8$ having been compressed, the assembly has still to be permuted by means of the permutation P. The latter is a permutation over 32 bits and according to the prior art was executed separately.

According to the method of the invention, the compression transformation S and the permutation P are regrouped in a single operation.

Thus, for $I_1 = 00011101$, the method according to the invention gives, after carrying the masking, at the output O':

$$O'(1D) = 0101 \, 0000 \, 0000 \, 0000 \, 0000 \, 0000 \, 0000 \, 0000.$$

The method consists in integrating the permutation P in the compression transformation S. In order to achieve this, it is necessary to know that there are 256 values in the storage table of S. In fact, the input word is comprised by 8 successive inputs of elementary words Wi comprising 6 significant bits which each supply after compression and permutation 4 bits of the output word. Therefore, there are $2^6 \times 8$ possible values for 4 bits, i.e. 512 quartets or 256 octets for the assembly of the 8 storage tables $T_1$ to $T_8$.

For purposes of explanation, a preliminary table T' is constructed in the following manner. With each of the 64 possible values of an elementary word Wi is associated the 8 old a word, 32 bits in length, which is constituted by concatenating the 8 old quartets or compressed elementary words occupying positions corresponding to the same value of an elementary word Wi in the storage tables Ti of DES for each of the 64 possible values of an elementary word Wi as follows:

```
         T1       |    T2    |   |     T8
   C1 C2  C3 C4 | C5 C6  C7 C8 |...| C29 C30  C31 C32
                |              |   |
         14     |      15      |   |      13
   R0  1 1  1 0 | 1 1   1  1   |...| 1  1    0  1
                |              |   |
          4     |      1       |   |       2
   R1  0 1  0 0 | 0 0   0  0   |...| 0  0    1  0
        . .  . .| . .   . .    |...|. .     . .
        . .  . .| . .   . .    |...|. .     . .
        . .  . .| . .   . .    |...|. .     . .
         13     |      9       |   |      11
   R63 1 1  0 1 | 1 0   0  1   |...| 1  0    1  0
```

As is apparent, the above preliminary table T' has 32 columns C1 to C32 for the respective 32 bits constituted by concatenating the 8 quartets (compressed elementary words) corresponding to the same value of an elementary word Wi and 64 rows R0 to R63 for the 64 possible values of an elementary word Wi.

The columns of preliminary table T' are permuted in order by applying permutation P of DES to constitute the final look-up table T. Permutation P of DES will reorder columns C1 to C32 to:

C16 C7 C20 C21 C29 C12 C28 C17 ... C22 C11 C4 C25

The final storage table T thus contains in each row a 32 bit word which equals a hypothetical output word that would result from applying the compression S and permutation P of DES to a hypothetical input word composed of 8 successive elementary words Wi of the same value, each row corresponding to a different elementary word value.

During a compression transformation, not all the bits obtained are significant; in the present case, the recuperation of the useful bits is effected by masking of the non-significant bits. For this purpose, it is necessary to have available a system or set of masks Mi defined as a function of where the bit positions of a compressed elementary word, due to an elementary word Wi, are located in an output word as a result of the permutation P. There are as many masks Mi in this system as there are elementary words Wi in the input word in the present case, there are therefore 8 of them.

The preferred embodiment according to the invention is the execution of the step of transformation SP in the DES system commonly used for microcircuit cards. In fact, the application of the method is particularly suitable to execute this step, S being a compression from 48 bits to 32 mixed bits, while P being a simple permutation of 32 bits. It is, therefore, possible and advantageous to integrate the permutation P in the compression transformation S because the latter comprises 32 bits. Because the values of S are directly permuted by P, they are automatically present at the predetermined locations. The output obtained from table T in response to an elementary word Wi is a result word of 32 bits, of which only 4 bit locations are significant. It is, therefore, suitable to mask the non-significant bit locations to extract the bits from the 4 desired bit locations, which extracted bits will be correctly placed in the output word. The output word is therefore encoded in $4 \times 8 = 32$ bits, i.e. 4 octets.

In a manner specific for an application utilizing an 8-bit microprocessor with a DES system, the method can be resumed in the three following steps in response to each elementary word Wi of an input word:

retrieving in 4 8-bit bytes from the storage table T the 32 bit result word at the address (row) corresponding to the value of the elementary word Wi, masking, byte by byte, this result word with bytes mask Mi corresponding to the position of the elementary word Wi in the input word, to extract the significant bits, carrying out an Exclusive OR function (binary modulo 2 sum) to place the extracted significant bits into a residual (stored) 32 bit word that, after all elementary words Wi of an input word are processed, contains the output word.

In fact, the operations are successively performed on 8-bit bytes if the coding is obtained from an 8-bit microprocessor of the aforementioned type (6805 or 8048).

The method of the invention as just described can be implemented in a microcircuit card MCC like the one contained in FIG. 1. The microcircuit card of FIG. 1 contains a microprocessor MP, a Look-Up Table T and a Set of Masks Mi. For each successive elementary word making up an input word, the Microprocessor MP retrieves a 32 bit (i.e., as 4 8-bit bytes) result word from the address in the Look-Up Table corresponding to the 6 bit elementary word. Thereafter, the Microprocessor MP receives a 32 bit (i.e., as 4 8-bit bytes) mask from the Set of Masks Mi, depending upon the position of the elementary word in the input word (the position of the elementary word in the input data word being represented by 3 bits since 8 elementary words make up the input word). Once this procedure has been completed for each of the elementary words, the output word is determined by the Microprocessor MP in the manner described above.

We claim:

1. In a microcircuit card having a microprocessor, an addressable look-up table and a set of masks accessible to the microprocessor, a method of carrying out a combined compression transformation and permutation operation SP of the Data Encryption Standard (DES) to form an output data word from an input data word constituted by elementary data words at successive positions in the input data word, by in response to each successive elementary data word:

retrieving a result data word by the microprocessor from an address in said look-up table corresponding to the value of the elementary data word, said result data word having the same number of bit locations as said output data word, each address of said look-up table having stored therein a result data word which equals a predetermined output data word which would be produced by carrying out said combined compression transformation and permutation operation on a predetermined input data word in which each of the elementary data words at the successive positions in the predetermined input data word has a same value corresponding to said address;

applying a mask from said set, selected based upon the position of the elementary data word in the input data word, to the retrieved result data word to extract a predetermined number of data bits at respective predetermined locations in the result data word; and presenting the extracted bits at said respective predetermined locations in said output data word.

2. A method as claimed in claim 1, wherein said input data word has 48 bit locations constituted by 8 elementary data words each having 6 significant bits, said look-up table has 64 addresses each containing a 32 bit result data word, and said predetermined number of data bits is 4.

3. A microcircuit card having a microprocessor and a data structure comprising a table stored within said card for carrying out a combined compression transformation and permutation operation SP of the Data Encryption Standard (DES) to form an output data word from an input data word constituted by elementary data words at successive positions in the input data word, said data structure comprising an addressable look-up table accessible to the microprocessor having stored therein at each address a result data word which equals a predetermined output data word which would be produced by carrying out said combined compression transformation and permutation operation on a predetermined input data word in which each of the elementary data words at the successive positions in the predetermined input data word has a same value corresponding to said address.

4. A microcircuit card as claimed in claim 3, wherein said input data word has 48 bit locations constituted by 8 elementary data words each having 6 significant bits and said look-up Tables has 64 addresses each containing a 32 bit result data word.

5. A microcircuit card as claimed in claim 3, further comprising a set of masks stored within said microcircuit card, there being a different mask in said set for each position of the elementary data word in the input data word, each mask being configured to extract a predetermined number of data bits at respective predetermined locations in a result data word retrieved by the microprocessor from said addressable look-up table.

6. A microcircuit card as claimed in claim 5, wherein said input data word has 48 bit locations constituted by 8 elementary data words each having 6 significant bits, said look-up table has 64 addresses each containing a 32 bit result data word, and said predetermined number of data bits is 4.

* * * * *